Figure 1:
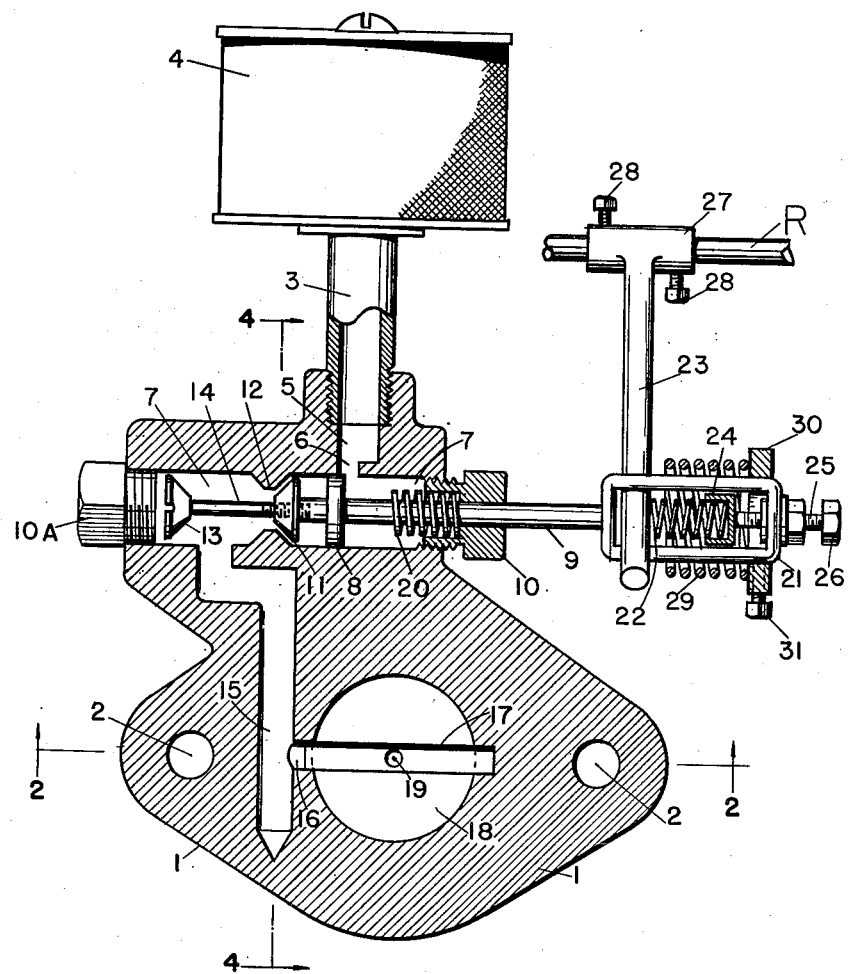

June 8, 1954  J. A. PEREZ  2,680,604
AUXILIARY AIR VALVE FOR CARBURETORS
Filed Nov. 16, 1951  2 Sheets-Sheet 1

INVENTOR
JOSE ARGIBAY PEREZ
BY Stewart Black
ATTORNEY

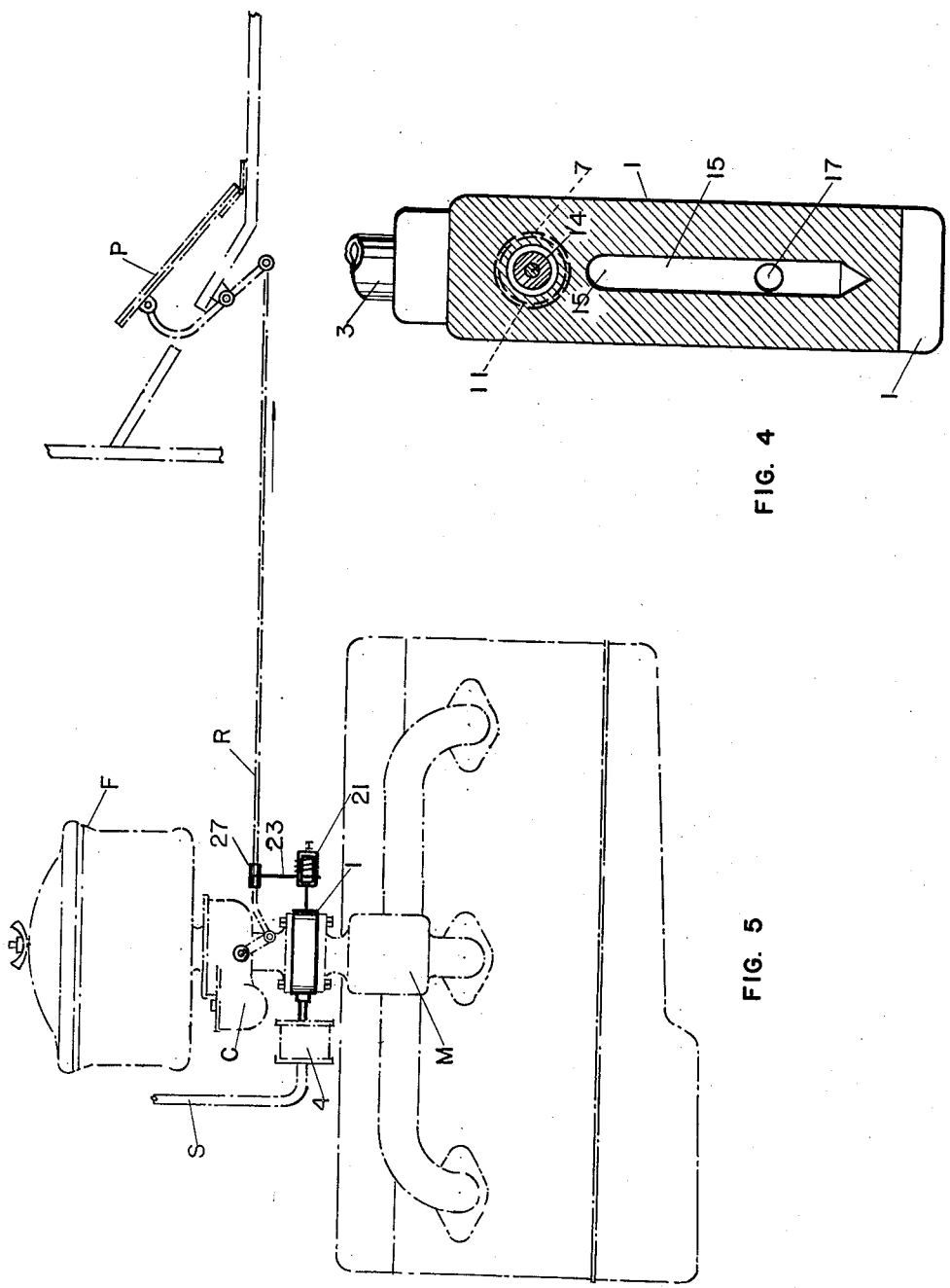

Patented June 8, 1954

2,680,604

UNITED STATES PATENT OFFICE 2,680,604

AUXILIARY AIR VALVE FOR CARBURETORS

José Argibay Perez, Central Preston, Cuba

Application November 16, 1951, Serial No. 256,755

1 Claim. (Cl. 261—47)

This invention relates to an auxiliary air valve of the type which delivers and regulates a supplemental air supply to the fuel-and-air mixture normally delivered by a carbureter to the combustion chambers of internal combustion engines.

The invention has for an object to provide an auxiliary air valve which will be simple in construction and efficient in operation.

Another object is to provide apparatus of the character described, capable of effecting the positive control of the fuel and air balance responsive to the operating conditions in the combustion cylinders and the application thereto of the operation of conventional foot pedal accelerators.

Further advantages of the invention will be discernible as the detailed description thereof hereinafter proceeds.

According to the invention, the auxiliary air valve has a casing or valve body of a pattern installable intermediate the companion flanges of the carbureter and intake manifold assembly or the device may be formed integrally with carbureter structure. This casing has an air intake chamber and a valve chamber communicating therewith, a main air passage receiving air from the valve chamber and a branch passage embodied in a discharge tube communicating with the main air passage and adapted to deliver the auxiliary air stream at the center of a Venturi passage forming the main fuel-and-air delivery conduit between the carbureter and the manifold intake, whereby to insure the efficient mixing of these combustion elements by virtue of the relatively greater turbulence developing in a Venturi type of structure receiving auxiliary air through the arrangement of air delivery passages herein provided. Arranged in the valve chamber, is a pair of opposed valves which are governed by a mechanical relationship established between the accelerator foot pedal and the cylinder operating conditions to move to adjust the auxiliary air supply admitted to the manifold intake structure.

Figure 2:
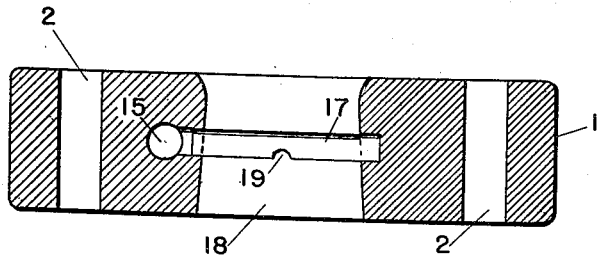
Figure 3:
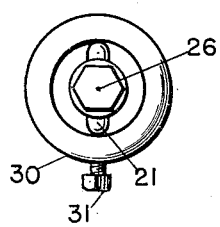

The invention is embodied in an auxiliary air valve exemplified in the accompanying drawings in which the views are as follows, like reference numerals designating identical parts throughout the several views:

Fig. 1, a horizontal section through the casing;

Fig. 2, a section on line 2—2 of Fig. 1;

Fig. 3, an end elevation of the spring cage mechanism, in part;

Fig. 4, a section on line 4—4 of Fig. 1; and

Fig. 5, a schematic diagram showing the relative location of the invention in a conventional automotive engine and control arrangement.

The auxiliary air valve is arranged in a casing or valve body 1 (Fig. 1), the pattern of which is designed to permit the installation thereof intermediate the companion flanges of a carbureter C (Fig. 5), and the manifold intake M on the engine served thereby, bolt holes 2 being provided through the casing to accommodate bolts or studs securing these flanges.

Threaded into one end of the casing, is a supply pipe 3 delivering auxiliary air thereto. This piping may be taken off a conventional air filter 4 or may be replaced by a conduit S serving the main air filter F (Fig. 5), with which an engine comes regularly equipped.

The supply pipe 3 discharges into an intake chamber 5 communicating through a restricted inlet 6 with an elongated valve chamber 7. Arranged in the valve chamber, is a piston 8 reciprocable therein in relation to the inlet 6, being carried on a valve stem 9 having slideable movement through an access plug 10 which is adjustably threaded into one end of the valve chamber, the opposite end thereof being fitted with an access plug 10A.

On its inner end, the valve stem 9 is fitted with a conical valve plug 11 engageable with the adjacent face of a double faced annular valve seat 12, the reverse face of which is engageable by a similar opposed valve plug 13 axially spaced from the plug 11 and carried on an extension 14 projecting from the stem 9 and threadably connected therewith.

The stem 9 is thus reciprocable in the valve chamber to effect the admission thereinto and discharge therefrom of auxiliary air delivered from the supply pipe 3.

Communicating with the valve chamber is a main air passage 15 from which a relatively short lateral branch 16 is taken off to form a socket for the reception of a discharge tube 17. This tube extends diametrically across a Venturi passage 18 passing through the casing to connect the carbureter outlet discharging its fuel-and-air stream with the intake manifold. Centrally of its span across the venturi, the tube 17 has a discharge orifice 19 to direct an auxiliary air jet into the axis of the fuel-and-air stream delivered by the carbureter whereby to insure, at the junction of the two streams, a maximum turbulence promoting the efficient mixing thereof.

Recessed within the stem of the plug 10, is an axially disposed helical spring 20 functioning as a cushion against the impact of the piston 8 on reaching its rightmost station, as viewed in Fig. 1, this spring being coiled about the stem 9 and held in any suitable manner within the plug 10.

The stem 9 terminates at its outer end in a rectangular open spring cage 21, in which is arranged a coil spring 22, one end of which engages a pusher rod 23 and the opposite end of which is received in an annular socket 24, or cup, advanceable against the spring by a bolt 25 threaded into the end of the cage and turnable by a cap 26. The pusher rod terminates in a collar 27 sleeved about the accelerator rod R and adjustably secured thereto as by set screws 28. The pusher rod 23 is likewise engageable with an outer helical spring 29, coiled about the cage 21 and bearing against an annular collar ring 30 adjustably secured to the cage structure by a set screw 31.

In practice, with an idling engine and a vacuum developing in the cylinders thereof by virtue of the pumping action of the pistons therein, the valve structure carried by the stem 9 will move leftward, as viewed in Fig. 1; valve 11 will remain seated. This movement of piston 8 compresses spring 22. Upon moving the accelerator rod R rightward, as when bearing down on the foot pedal P, the pusher rod 23 likewise moves rightward and further compresses spring 22 until spring 29 is engaged by rod 23. Continued movement of the accelerator rod to the right will further compress spring 29 until, suction pressure in the engine being overcome, the piston 8 will move to the right beyond the inlet 6. Valve 11, moving with the piston, is now open for the admission of auxiliary air to the passages of the casing so as to discharge an air jet through orifice 19, where the fuel-and-air stream normally issuing out of the carbureter becomes mixed therewith and by virtue of the turbulence developing in the Venturi passage 18, this mixing process will be thorough and uniform. Upon releasing the accelerator pedal and resulting leftward movement of the rod R, tension of spring 29 will be relaxed, leaving only spring 22 to act upon the piston 8, now holding valve 11 open until the engine reduces speed to a point where piston 8 will close the inlet 6. Valve 13 functions when, during periods when the engine is under peak loads, it will be seen that the engine under load will be performing relatively slowly, the accelerator pedal P being depressed "to the board." Rod R and rod 23 move rightward to shift the valve assembly therewith, and valve 13 seals the adjacent valve seat. In this condition, the auxiliary air stream will be interrupted, the engine receiving the normal fuel-and-air mixture handled by the carbureter.

The auxiliary air valve hereinabove described thus provides an improved supplemental air control whereby an economy of fuel is attained and the objects of the invention set forth above are achieved.

I claim:

An auxiliary air valve comprising a casing adapted for installation intermediate the carbureter and intake manifold of an internal combustion engine, said casing having a Venturi passage registrable with the outlet of said carbureter and inlet of said intake manifold for conveying a fuel-and-air stream therebetween, a discharge tube diametrically disposed across said Venturi passage and orificed to direct an auxiliary air jet into the center of said stream, said casing having an intake chamber, a valve chamber, and an inlet port interposed therebetween, a main air passage communicating with said valve chamber and a lateral passage opening from said main passage, said lateral passage forming a socket for the reception of said discharge tube and communicating therewith, valve means arranged in said valve chamber and having mechanical association with the accelerator rod controlling the throttle of said carbureter to govern the passage of auxiliary air through said valve chamber for delivery to the discharge tube, said valve means including a valve stem reciprocable in said valve chamber and extending exteriorly of said casing, a piston carried by said stem in slideable movement across said inlet port to govern the admission of air to said valve chamber, a pair of axially spaced valves carried by said stem and a double-faced annular valve seat formed in said valve chamber intermediate said valves for engagement by either of said valves in sealing relation therewith to govern the discharge of air from said valve chamber upon the reciprocal movement of said stem, a spring cage mounted on said stem on the exterior extension thereof, a pusher rod extending at one end through said cage and connected at its opposite end to said accelerator rod, spring means disposed in said cage in axial alinement with said stem and bearing against said pusher rod to urge said stem into axial movement relative to said accelerator rod for the actuation of said piston and said valves.

References Cited in the file of this patent

UNITED STATES PATENTS

| Number | Name | Date |
|---|---|---|
| 1,174,897 | Preston | Mar. 7, 1916 |
| 1,378,449 | Grimm et al. | May 17, 1921 |
| 1,522,447 | Hamilton | Jan. 6, 1925 |
| 1,715,440 | Wagner | June 4, 1929 |
| 1,916,938 | Small | July 4, 1933 |
| 1,956,657 | Scheel | May 1, 1934 |
| 2,078,481 | Chanavier | Apr. 27, 1937 |
| 2,094,272 | Langhaar | Sept. 28, 1937 |
| 2,518,082 | Shively | Aug. 8, 1950 |

FOREIGN PATENTS

| Number | Country | Date |
|---|---|---|
| 354,704 | Great Britain | Feb. 10, 1930 |